April 14, 1964 G. R. MONROE ETAL 3,129,377
TRANSFORMER FOR CONNECTING A THREE-PHASE
SYSTEM TO A TWO-PHASE SYSTEM
Filed Nov. 14, 1960

WITNESSES
*John E. Hearly Jr.*
*James F. Young*

INVENTORS
Gordon R. Monroe &
George F. Mitchell, Jr.
BY
*Clement L. McHale*
ATTORNEY united States Patent Office
3,129,377
Patented Apr. 14, 1964

3,129,377
TRANSFORMER FOR CONNECTING A THREE-
PHASE SYSTEM TO A TWO-PHASE SYSTEM
Gordon R. Monroe and George F. Mitchell, Jr., Hickory
Township, Mercer County, Pa., assignors to Westinghouse Electric Corporation, East Pittsburgh, Pa., a corporation of Pennsylvania
Filed Nov. 14, 1960, Ser. No. 69,089
3 Claims. (Cl. 321—57)

This invention relates to electrical inductive apparatus and more particularly to transformers.

In a conventional transformation system for connecting a three-phase alternating current electric power system to a two-phase system, two separate single phase transformers are commonly connected in the well-known Scott connection. In the latter arrangement, the coils or windings of the two separate transformers, which are known as the main and teaser transformers, are inductively disposed on separate magnetic core structures. The conventional arrangement just described has several disadvantages which relate to the size and weight of the two separate transformers required and the amount of magnetic material required for the separate magnetic core structures. It is therefore desirable to provide an improved means for interconnecting a three-phase alternating current system with a two-phase alternating current system.

It is an object of this invention to provide a new and improved means for connecting a three-phase alternating current electric power system to a two-phase system.

Another object of this invention is to provide a new and improved magnetic core structure for electrical inductive apparatus, such as transformers.

A more specific object of this invention is to provide a new and improved core and coil assembly for a transformer connected between a three-phase alternating current system and a two-phase alternating current system.

Other objects of the invention will in part be obvious and will in part appear hereinafter.

For a fuller understanding of the nature and objects of the invention, reference should be had to the following detailed description taken in connection with the accompanying drawing, in which.

Figure 1:
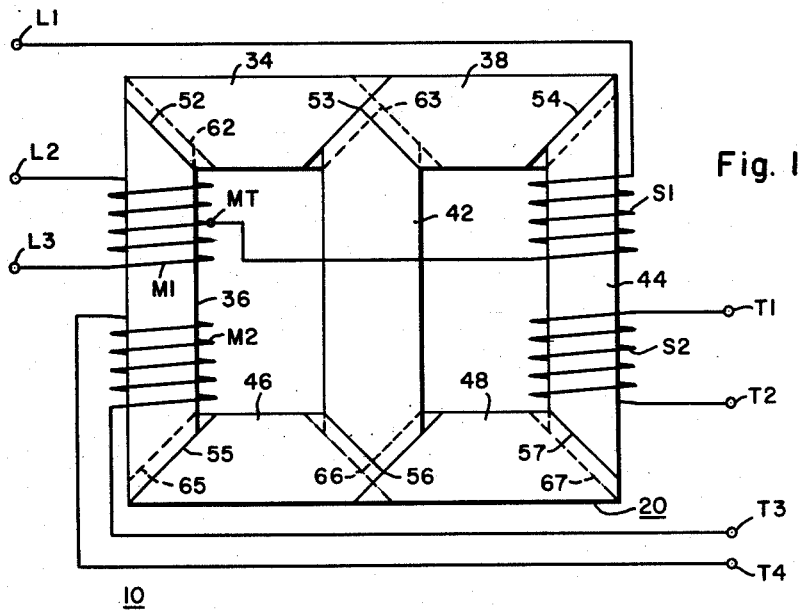
FIGURE 1 is a diagrammatic representation of a transformer core and coil assembly embodying the teachings of the invention.

Referring now to the drawing and FIG. 1 in particular, there is illustrated a transformer core and coil assembly 10 embodying the teachings of the invention. In this instance, the transformer core and coil assembly 10 is adapted for connection between a three-phase alternating current electric power system at the terminals L1, L2 and L3 and a two-phase alternating current system at the terminals T1 through T4. The core and coil assembly 10 includes a magnetic core structure 20 and the windings M1, M2, S1 and S2, which are inductively disposed thereon.

As illustrated, the magnetic core 20 is generally rectangular in configuration and includes two substantially rectangular windows through which the conductor turns of the associated windings pass. In general, the magnetic core 20 includes a plurality of stacked layers of assembled laminations formed from a magnetic strip material or sheet material having at least one preferred direction of magnetic orientation lengthwise of said material or substantially parallel to the longitudinal dimension of said material, such as cold rolled silicon steel.

In particular, each of the layers of laminations of the magnetic core 20 comprises the first and second outer leg laminations 36 and 44, respectively, the intermediate or central leg lamination 42, the first and second upper yoke laminations 34 and 38, respectively, and the first and second lower yoke laminations 46 and 48, respectively, the ends of the leg laminations being connected by the associated yoke laminations in each layer to form the different closed magnetic circuits or loops in the magnetic core 20. As previously mentioned, the laminations which make up each of the layers of the magnetic core 20 are assembled around two substantially rectangular windows with the first and second outer leg laminations and the intermediate leg lamination spaced apart from one another and disposed substantially parallel with respect to one another, as shown in FIG. 1.

Both ends of each of the first and second outer leg laminations 36 and 44 respectively are cut at an oblique angle, preferably at an angle of substantially 45° with respect to the direction of orientation of the strip material from which said laminations are formed. Both ends of the intermediate leg lamination 42 are cut to be generally V-shaped, both sides at each end of the intermediate leg lamination 42 being cut at an oblique angle, preferably an angle of substantially 45° with respect to the direction of orientation of the strip material from which said intermediate leg lamination is formed. The points or tips of the V-shaped ends of the intermediate leg lamination 42 are displaced from an axial center line through said intermediate leg lamination in opposite directions at the opposite ends of said intermediate leg lamination. One end of each of the yoke laminations 34, 38, 46, and 48 is cut at an oblique angle, preferably at an angle of substantially 45° with respect to the direction of orientation of the strip material from which said laminations are formed. The major portion of the other end of the first upper and the second lower yoke laminations 34 and 48, respectively, is cut at an oblique angle, preferably at an angle of substantially 45° with respect to the direction of orientation of the strip material from which said laminations are formed, while the minor portion of said end is cut to be substantially perpendicular with respect to said direction of orientation. The other end of each of the second upper and first lower yoke laminations 38 and 46, respectively, is cut to be generally V-shaped, the sides of said end being both cut at an oblique angle, preferably at an angle of substantially 45° with respect to the direction of orientation of the strip material from which said laminations are formed and is displaced from an axial center line through said yoke laminations. For reasons which will be explained hereinafter, the width of the intermediate leg laminations 42 is preferably equal to substantially the $\sqrt{2}$ or 1.4 times the width of each of the first and second outer leg laminations 36 and 44, respectively.

In order to provide an area of overlap between the corresponding joints between the adjacent ends of the laminations and the successive layers of the magnetic core 20, the manner in which the laminations are stacked in successive alternate layers is reversed as shown in FIG. 1. In particular, the joints between the outer leg laminations and the associated yoke laminations at a first pair of diagonally opposite outer corners of the magnetic core 20 extend in a continuous straight line from a corner of the nearest window to a point which is offset from the nearest outside corner of the overall core, as indicated at 52 and 57, for the first layer of laminations shown in FIG. 1 and at 64 and 65 for the next adjacent layer of laminations, shown in FIG. 1 in dotted line. The joints between the adjacent ends of the outer leg laminations and the associated yoke laminations in each layer at the other diagonally opposite pair of corners extend from a point which is offset from the nearest window of the magnetic core 20 in a continuous straight line to the nearest outside corner as indicated at 54 and 55 for the first layer of laminations shown in FIG. 1 and, as indicated at 62 and 67, for the next adjacent layer of laminations shown in FIG. 1. Since the joints between the adjacent ends of the outer leg and yoke laminations in successive alternate layers are displaced from one another to provide an area of overlap of the magnetic material from which said laminations are formed, the effective magnetic reluctance of the core 20 is thereby reduced. Similarly, the generally V-shaped joints between the intermediate leg laminations 42 and the associated yoke laminations in successive alternate layers are offset or displaced from one another in an axial direction with respect to the longitudinal dimension of the strip material from which the yoke laminations are formed, as indicated at 53 and 63 at the upper end of the intermediate yoke lamination 42 in FIG. 1. An area of overlap is therefore provided between the alternate joints of said intermediate leg laminations in successive layers to also decrease the effective magnetic reluctance of the magnetic core 20. The substantially mitered or diagonal joints between the different laminations which make up each of the layers of magnetic core 20 also permits the magnetic flux which results in said magnetic core during operation to flow between the different portions of the magnetic core 20 in a substantially continuous straight line and minimizes the travel of the magnetic flux crosswise to the preferred direction of orientation of the strip material from which said laminations are formed. It is to be noted that the width of the yoke laminations 34, 38, 46 and 48 in each of the layers of the magnetic core 20 must be greater than the width of the first and second associated outer leg laminations 36 and 44, respectively, in order to provide the necessary overlap between the corresponding joints in the different portions of the magnetic core 20.

As shown in FIG. 1, the first and second main windings or coils M1 and M2, respectively, of the core and coil assembly 10 are inductively disposed on the first outer leg portion of the magnetic core 20, which includes the first outer leg laminations 36. The first and second teaser windings or coils S1 and S2, respectively, are disposed on the second outer leg portion of the core and coil assembly 10 which includes the second outer leg laminations 44 of the magnetic core 20. The first main winding M1 is connected between the line terminals L2 and L3 of an associated three-phase alternating current system, while the second main winding M2 is connected between the terminals T3 and T4 of an associated two-phase alternating current system. The first teaser winding S1 is connected between the line terminal L1 of the associated three-phase alternating current system and substantially the mid-point or mid-tap connection MT of the first main winding M1. The second teaser winding or coil S2 is connected across the terminals T1 and T2 of the associated two-phase alternating current system.

In the operation of the core and coil assembly 10, the current which flows between the second teaser winding S2 and the associated two-phase alternating current system at the terminals T1 and T2 is substantially 90° out of phase with the current which flows between the second main winding M2 and the associated two-phase alternating current system at the terminals T3 and T4.

Figure 4:
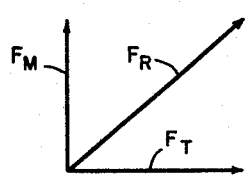
FIG. 4 is a vector diagram illustrating the operation of the core and coil assembly shown in FIG. 1.

Referring to FIG. 4, the magnetic flux produced by current flow in the main windings M1 and M2 in the first outer leg laminations 36 and in the intermediate leg laminations 42 of the magnetic core 20 is therefore substantially 90° out of phase with the magnetic flux produced in the second outer leg laminations 44 and in the intermediate leg laminations 42 by current flow in the teaser windings S1 and S2 as indicated by the vectors $F_M$ and $F_T$, respectively. The resultant magnetic flux in the intermediate leg portion of the magnetic core 20, as indicated by the vector $F_R$, in FIG. 4 is therefore substantially equal to $\sqrt{2}$ or 1.4 times the magnetic flux which flows in each of the first and second outer leg portions of the magnetic core 20. In order that the magnetic flux density in the intermediate leg portion of the magnetic core 20 be limited to substantially the same value as in each of the first and second outer leg portions of the magnetic core 20, the width of the intermediate leg laminations 42 is substantially the $\sqrt{2}$ or 1.4 times the width of each of the first and second outer leg laminations 36 and 44, respectively, and the corresponding cross-sectional area of the intermediate leg portion of the magnetic core 20 is also substantially the $\sqrt{2}$ or 1.4 times the effective cross-sectional area of each of the first and second outer leg portions of the magnetic core 20.

Figure 2:
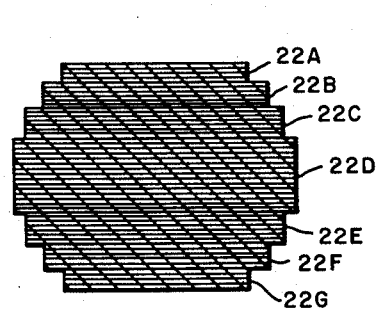
FIGS. 2 and 3 are cross-sectional views taken through different portions of the magnetic core structure of the core and coil assembly shown in FIG. 1.
Figure 3:
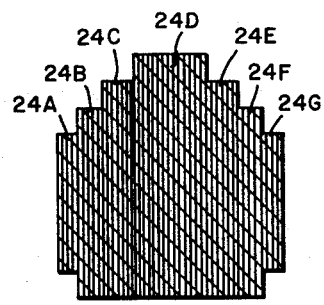

Referring to FIG. 2, the cross-section of the first and second outer and the intermediate leg portions of the magnetic core 20 may be of the cruciform type and include a plurality of groups of layers 22A through 22G each having different widths of laminations included therein. Each of the groups of layers 22A through 22G may also include a plurality of layers of the type shown in FIG. 1 in order that the magnetic core 20 may have a cross section which is adapted for use with associated preform windings having openings therethrough which are substantially circular in configuration. Similarly the cross-section of each of the upper and lower yoke portions of the magnetic core 20 may also be of the cruciform type and include a plurality of groups of layers 24A through 24G. Each of the groups 24A through 24G may also include a plurality of layers of laminations of different widths of strip material. It is to be understood that the laminations which make up the magnetic core 20 may be stacked in groups of three or more with the joints between successive groups alternated in the manner previously described for successive layers.

The laminations of the magnetic core 20 may also be formed from other suitable types of magnetic material, such as sheets of silicon-iron and aluminum-iron alloys containing from 1 to 7% silicon and from 1 to 10% aluminum, respectively, the sheets of said alloys having grains whose crystal lattice structure comprises four cube edges perpendicular to the plane of the sheet, known as cube texture, either doubly oriented or randomly oriented. The major volumetric proportion of the sheets is composed of grains having a crystalline lattice structure such that a cube face lies substantially parallel to the surface of the sheet and, in the doubly oriented material, four cube edges of the cube lattice are parallel to the rolling direction or edge of the sheet and four cube edges are transverse thereto; and, in the randomly oriented cube texture material, the grains may have eight cube edges randomly distributed through parallel to the surface of the sheet. One such doubly oriented cube textured silicon-iron alloy is that disclosed in copending application Serial No. 681,333, filed August 30, 1957 and in copending application Serial No. 19,440, filed April 21, 1960, which are both assigned to the same assignee as the present application.

It is also to be understood that the width of the outer leg and yoke laminations in a core and coil assembly as disclosed may be substantially equal where the joints at the outer corners of the core are modified in accordance with the core structure disclosed in U.S. Patent 2,393,038 which is assigned to the same assignee as the present application.

The apparatus embodying the teachings of this invention has several advantages. For example, the core and coil assembly disclosed provides a more compact transformer arrangement for connecting a three-phase alternating current system to a two-phase alternating current system. In addition, the quantity of magnetic material required for the common magnetic core structure is reduced while the associated materials required for the windings is also reduced.

Since numerous changes may be made in the above described apparatus, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. A transformer having two magnetic circuits ninety degrees out of phase providing uniform flux density, said transformer comprising a magnetic core including a plurality of stacked layers of laminations formed from magnetic strip material having at least one preferred direction of magnetic orientation substantially parallel to the longitudinal dimension of said strip material, each of said layers including first and second outer leg laminations which form first and second outer leg portions when stacked, an intermediate leg lamination and yoke laminations connecting the ends of said leg laminations assembled around two suustantially rectangular windows, the joints between the leg and yoke laminations of each layer being diagonal but joints with respect to the longitudinal dimension of the strip material from which the laminations are formed, the corresponding joints in alternate layers being offset from one another to provide an area of overlap between the respective joints, the width of the intermediate leg lamination in each layer being substantially 1.4 times the width of each outer leg lamination in said layer and first and second windings disposed on each of the first and second outer leg portions only, respectively, one end of the first winding on one outer leg portion being connected substantially to the mid-point of the first winding on the other outer leg portion.

2. A transformer having two magnetic circuits ninety degrees out of phase providing uniform flux density, said transformer comprising a magnetic core including a plurality of assembled layers of laminations formed from magnetic material having one preferred direction of orientation substantially parallel to the longitudinal dimension of said strip material and a second preferred direction of orientation transverse thereto, each of said layers including first and second outer leg laminations which form first and second outer leg portions when assembled, an intermediate leg lamination, and yoke laminations connecting the ends of said leg laminations, the laminations of each layer being assembled around two substantially rectangular windows, at least the major portion of the joints between the leg and yoke laminations of each layer being at an oblique angle with respect to the longitudinal dimension of the strip material from which said laminations are formed, at least the major portion of the adjacent joints in alternate layers being displaced from one another to provide an area of overlap of magnetic material therebetween, the width of the intermediate leg lamination in each layer being at least 1.4 times the width of each outer leg lamination in said layer and first and second windings disposed on each of the first and second outer leg portions only, respectively, one end of the first winding on one outer leg portion being connected substantially to the mid-point of the first winding on the other outer leg portion.

3. A transformer adapted for connection between a three-phase alternating current system and a two phase alternating current system wherein two magnetic circuits ninety degrees out of phase are combined to provide uniform flux density, said transformer comprising a magnetic core including first and second outer leg portions, an intermediate leg portion and yoke portions connecting the ends of said leg portions to define two substantially rectangular windows, first and second main windings disposed on said first outer leg portion, first and second teaser windings disposed on said second outer leg portion, one end of said first teaser winding being connected to substantially the mid-point of said first main winding, both ends of said second main winding and both ends of said second teaser winding being adapted for connection to a two-phase alternating current system, the cross-sectional area of said intermediate leg portion being at least 1.4 times the cross-sectional area of each of said outer leg portions.

References Cited in the file of this patent
UNITED STATES PATENTS

| | | |
|---|---|---|
| 764,213 | Steinmetz | July 5, 1904 |
| 2,898,565 | Fox et al. | Aug. 4, 1959 |

FOREIGN PATENTS

| | | |
|---|---|---|
| 136,211 | Great Britain | Dec. 18, 1919 |
| 418,638 | Great Britain | Oct. 29, 1934 |